US012642289B2

(12) United States Patent
Hagihara et al.

(10) Patent No.: US 12,642,289 B2
(45) Date of Patent: Jun. 2, 2026

(54) SUGAR-RESTRICTED, HIGH-FAT DIET FOR IMPROVING LIVER DISEASE

(71) Applicant: OSAKA UNIVERSITY, Osaka (JP)

(72) Inventors: Keisuke Hagihara, Osaka (JP); Katsufumi Kajimoto, Osaka (JP)

(73) Assignee: OSAKA UNIVERSITY, Osaka (JP)

(*) Notice: Subject to any disclaimer, the term of this patent is extended or adjusted under 35 U.S.C. 154(b) by 993 days.

(21) Appl. No.: 17/768,337

(22) PCT Filed: Oct. 13, 2020

(86) PCT No.: PCT/JP2020/038611
§ 371 (c)(1),
(2) Date: Apr. 12, 2022

(87) PCT Pub. No.: WO2021/075422
PCT Pub. Date: Apr. 22, 2021

(65) Prior Publication Data
US 2023/0085223 A1     Mar. 16, 2023

(30) Foreign Application Priority Data

Oct. 15, 2019    (JP) ................................. 2019-188669

(51) Int. Cl.
*A23L 33/115* (2016.01)
*A23L 33/12* (2016.01)

(52) U.S. Cl.
CPC ............. *A23L 33/115* (2016.08); *A23L 33/12* (2016.08)

(58) Field of Classification Search
None
See application file for complete search history.

(56) References Cited

U.S. PATENT DOCUMENTS

2017/0208829 A1    7/2017  Oonishi et al.
2018/0214410 A1    8/2018  Hagihara et al.

FOREIGN PATENT DOCUMENTS

WO       2004/022049       3/2004

OTHER PUBLICATIONS

Softic, S., Cohen, D. E., & Kahn, C. R. (2016). Role of dietary fructose and hepatic de novo lipogenesis in fatty liver disease. Digestive diseases and sciences, 61, 1282-1293. (Year: 2016).*
Lundsgaard, A. M., Holm, J. B., Sjøberg, K. A., Bojsen-Møller, K. N., Myrmel, L. S., Fjære, E., . . . & Kiens, B. (2019). Mechanisms preserving insulin action during high dietary fat intake. Cell Metabolism, 29(1), 50-63. (Year: 2019).*
Lee, T. H., Kim, W. R., & Poterucha, J. J. (2012). Evaluation of elevated liver enzymes. Clinics in liver disease, 16(2), 183-198. (Year: 2012).*

Saida, T., Fukushima, W., Ohfuji, S., Kondo, K., Matsunaga, I., & Hirota, Y. (2014). Effect modification of body mass index and body fat percentage on fatty liver disease in a Japanese population. Journal of gastroenterology and hepatology, 29(1), 128-136. (Year: 2014).*
"How Refined Sugar Can Damage Your Liver". Jan. 17, 2018. Retrieved from the internet: <https://www.amsety.com/livermatters/what-to-avoid/refined-sugar-can-damage-liver/> (Year: 2018).*
"How Much Sugar?". May 3, 2017. Retrieved from the internet: < https://www.commercedrivedental.com/how-much-sugar/> (Year: 2017).*
Rolls, B. J. (2017). Dietary energy density: applying behavioural science to weight management. Nutrition bulletin, 42(3), 246-253. (Year: 2017).*
Can Eating Too Few Calories Prevent Weight Loss ?. Boldt Jun. 9, 2011. Retrieved from the internet <https://www.livestrong.com/article/536160-can-eating-too-few-calories-prevent-weight-loss/> (Year: 2011).*
Noakes, T. D., & Windt, J. (2017). Evidence that supports the prescription of low-carbohydrate high-fat diets: a narrative review. British journal of sports medicine, 51(2), 133-139. (Year: 2017).*
Ronis, M. J., Baumgardner, J. N., Sharma, N., Vantrease, J., Ferguson, M., Tong, Y., . . . & Badger, T. M. (2013). Medium chain triglycerides dose-dependently prevent liver pathology in a rat model of non-alcoholic fatty liver disease. Experimental Biology and Medicine, 238(2), 151-162. (Year: 2013).*
Musso, G., Cassader, M., Cohney, S., De Michieli, F., Pinach, S., Saba, F., & Gambino, R. (2016). Fatty liver and chronic kidney disease: novel mechanistic insights and therapeutic opportunities. Diabetes care, 39(10), 1830-1845. (Year: 2016).*
Sanna, C., Rosso, C., Marietti, M., & Bugianesi, E. (2016). Non-alcoholic fatty liver disease and extra-hepatic cancers. International journal of molecular sciences, 17(5), 717. (Year: 2016).*
International Search Report (ISR) issued Dec. 15, 2020 in International (PCT) Application No. PCT/JP2020/038611.
Erik Kirk et al., "Dietary Fat and Carbohydrates Differentially Alter Insulin Sensitivity During Caloric Restriction", Gastroenterology, vol. 136, No. 5, pp. 1552-1560, May 2009, cited in ISR.
Stefano Ministrini et al., "Lysosomal Acid Lipase as a Molecular Target of the Very Low Carbohydrate Ketogenic Diet in Morbidly Obese Patients: The Potential Effects on Liver Steatosis and Cardiovascular Risk Factors", Journal of Clinical Medicine, vol. 8, 621, pp. 1-13, May 7, 2019, cited in ISR.
Office Action issued Aug. 20, 2024 in Japanese Patent Application No. 2021-552392, with English-language translation.
International Preliminary Report on Patentability and Written Opinion of the International Searching Authority issued Apr. 19, 2022 in International (PCT) Application No. PCT/JP2020/038611.

(Continued)

*Primary Examiner* — Anna R Falkowitz
(74) *Attorney, Agent, or Firm* — Wenderoth, Lind & Ponack, L.L.P.

(57)          ABSTRACT

The present invention provides a sugar-restricted, high-fat diet for improving liver disease. In the sugar-restricted, high-fat diet, daily fat intake may be set at 120 g or more based on a real body weight of 50 kg or set at an amount corresponding to 70% or more of the total daily energy intake. The sugar-restricted, high-fat diet can reduce body fat mass and AST, ALT, and γ-GTP levels in nonalcoholic fatty liver disease patients.

6 Claims, 5 Drawing Sheets

(56)           References Cited

OTHER PUBLICATIONS

Notice of Reasons for Refusal issued Jan. 28, 2025 in corresponding Japanese Patent Application No. 2021-552392, with English language translation.

Kiyoshi Hayasaka et al., "Medium-chain triglyceride supplementation under a low-carbohydrate formula is a promising therapy for adult-onset type II citrullinemia", Molecular Genetics and Metabolism Reports 1, 2014, pp. 42-50.

Sachiko Takase, "Interrelationship between Gluconeogenesis and Ureogenesis in Rats Fed a High Fat, Carbohydrate-Free Diet", Japanese Journal of Nutrition and Food Science, 1985, vol. 38, No. 2, pp. 109-116, with English language translation.

Lin Zhang et al., "Medium-Chain Triglycerides Attenuate Liver Injury in Lipopolysaccharide-Challenged Pigs by Inhibiting Necroptotic and Inflammatory Signaling Pathways", International Journal of Molecular Sciences, 2018, vol. 19, No. 3697, pp. 1-14.

\* cited by examiner

SUGAR-RESTRICTED, HIGH-FAT DIET FOR IMPROVING LIVER DISEASE

TECHNICAL FIELD

The present invention relates to a sugar-restricted, high-fat diet for improving liver disease.

BACKGROUND ART

A "ketogenic diet" is one of the well-known dietary regimens. The "ketogenic diet" is a sugar-restricted, high-fat diet characterized in that 60 to 90% of energy intake is from fat. The "ketogenic diet" is therefore used for the treatment of patients who require a sugar-restricted diet, for example, children with epilepsy (e.g., Patent Literature 1). Recently, a dietary regimen based on the "ketogenic diet" has been proposed as a potential treatment for cancer patients (e.g., Patent Literature 2). There are some case reports showing a dramatic clinical response to a ketogenic diet regimen.

In Japan, the number of obese people is increasing because of the westernization of the diet and lack of exercise, and the incidence of nonalcoholic fatty liver disease (NAFLD), a hepatic phenotype of metabolic syndrome, is increasing. Fatty liver is a condition in which triglycerides are accumulated in the liver. A type of fatty liver that occurs in people who drink little or no alcohol is called NAFLD. Types of NAFLD include simple fatty liver, which does not progress and has a benign course, and non-alcoholic steatohepatitis (NASH), which may progress to cirrhosis and liver cancer. Causes of NAFLD include obesity (visceral fat accumulation), diabetes, dyslipidemia, hypertension, rapid weight loss or acute starvation, drugs (tamoxifen, steroids, amiodarone, etc.), and complete intravenous nutrition.

In an epidemiological health survey of a total of 11714 people (5811 men and 5903 women) in Japan, about 32% of men and about 9% of women were diagnosed with NAFLD, and of these, about 85% of men and about 87% of women met the criteria for metabolic syndrome. NASH accounts for 20 to 30% of all NAFLD cases, and there are estimated to be about 2 million NASH patients in Japan.

Now that viral liver disease is controllable, there is no doubt that NAFLD will be the most important causative disease of cirrhosis and liver cancer in the near future. The only treatment for advanced cirrhosis with liver failure is liver transplantation, and there is currently no well-established evidence-based treatment for NAFLD or NASH.

CITATION LIST

Patent Literature

Patent Literature 1: Japanese Patent No. 5937771
Patent Literature 2: WO 2017/038101

SUMMARY OF INVENTION

Technical Problem

An object of the present invention is to find a new target disease for which a ketogenic diet (sugar-restricted, high-fat diet) regimen is effective.

Solution to Problem

The present invention includes the following to achieve the above-mentioned object.

[1] A sugar-restricted, high-fat diet for improving liver disease.
[2] The sugar-restricted, high-fat diet according to the above [1], wherein the liver disease is nonalcoholic fatty liver disease or nonalcoholic steatohepatitis.
[3] The sugar-restricted, high-fat diet according to the above [1] or [2], wherein the improving of liver disease is associated with a decreased level of at least one selected from AST, ALT, and γ-GTP.
[4] The sugar-restricted, high-fat diet according to any one of the above [1] to [3], wherein the improving of liver disease is associated with a decreased body fat mass.
[5] The sugar-restricted, high-fat diet according to any one of the above [1] to [4], wherein daily fat intake in the diet is set at 120 g or more based on a real body weight of 50 kg or set at an amount corresponding to 70% or more of a total daily energy intake.
[6] The sugar-restricted, high-fat diet according to any one of the above [1] to [5], wherein the fat is a fat containing a medium-chain fatty acid oil.
[7] The sugar-restricted, high-fat diet according to the above [6], wherein the percentage of the medium-chain fatty acid oil in the fat is 30% by mass or more.
[8] The sugar-restricted, high-fat diet according to any one of the above [1] to [7], wherein daily sugar intake in the diet is set at 30 g or less based on a real body weight of 50 kg.
[9] The sugar-restricted, high-fat diet according to any one of the above [1] to [8], wherein the sugar is a sugar containing lactose.
[10] The sugar-restricted, high-fat diet according to any one of the above [1] to [9], wherein the diet comprises 5 to 40% by mass protein.
[11] The sugar-restricted, high-fat diet according to any one of the above [1] to [10], wherein daily calorie intake in the diet is 1000 kcal or more based on a real body weight of 50 kg.
[12] The sugar-restricted, high-fat diet according to any one of the above [1] to [11], wherein the diet comprises 25 to 40% by mass long-chain fatty acid oil, 30 to 50% by mass medium-chain fatty acid oil, 15% by mass or less sugar, and 10 to 30% by mass protein.

Advantageous Effects of Invention

The present invention provides a sugar-restricted, high-fat diet for improving liver disease. The sugar-restricted, high-fat diet (ketogenic diet) can reduce AST, ALT, and γ-GTP levels and body fat mass in NAFLD patients.

BRIEF DESCRIPTION OF DRAWINGS

FIG. 3A is a graph of AST, FIG. 3B is a graph of ALT, FIG. 3C is a graph of γ-GTP, and FIG. 3D is a graph of ALP.

FIG. 6A is a graph of AST, FIG. 6B is a graph of ALT, FIG. 6C is a graph of γ-GTP, and FIG. 6D is a graph of FIB4-index.

FIG. 7A is a graph of body weight, FIG. 7B is a graph of BMI, FIG. 7C is a graph of body fat mass, and FIG. 7D is a graph of SMI.

DESCRIPTION OF EMBODIMENTS

Figure 1:
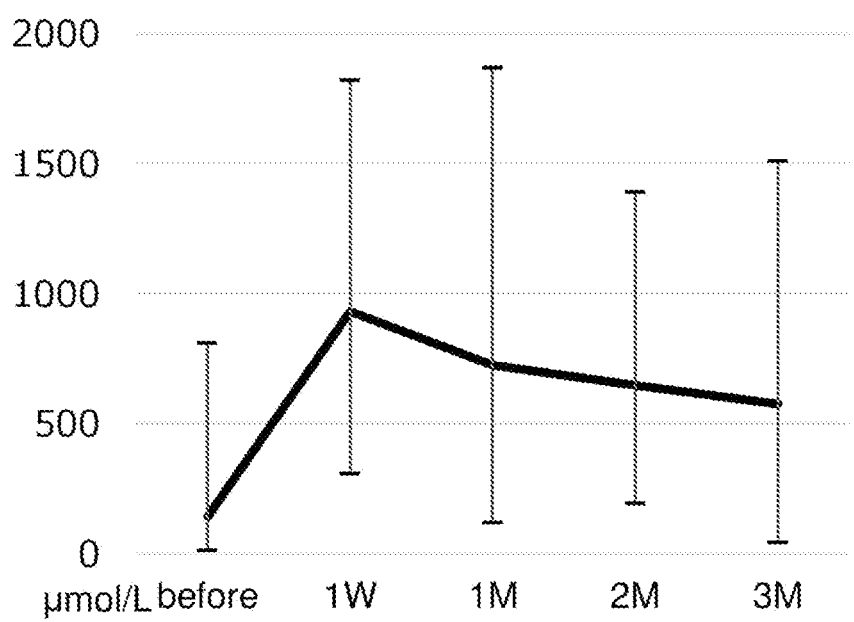
FIG. 1 shows a change in blood acetoacetic acid levels in 37 analyzed patients who participated in the clinical study of a ketogenic diet regimen for cancer treatment.

The present invention provides a sugar-restricted, high-fat diet for improving liver disease. The "sugar-restricted, high-fat diet" means a diet that restricts sugar intake and allows more fat intake as compared to a normal diet. The "sugar-restricted, high-fat diet" is also known as a "ketogenic diet". As used herein, the "sugar" refers to a type of carbohydrate that is not a dietary fiber. As used herein, the "carbohydrate" refers to an organic compound composed of a monosaccharide as a structural unit. The "carbohydrate" used in the context of the sugar-restricted, high-fat diet refers to a type of carbohydrate other than a dietary fiber, i.e., a "sugar", and the terms "carbohydrate" and "sugar" are used interchangeably.

As used herein, the "high-fat diet" is characterized in that daily fat intake in the diet is set at an amount corresponding to about 30% or more of the total daily energy intake. The lower limit of the daily fat intake in the "high-fat diet" may be about 40%, about 45%, about 50%, about 55%, about 60%, about 65%, about 70%, about 75%, about 80%, about 85%, or about 90% of the total daily energy intake. The upper limit may be about 95%, about 90%, about 85%, about 80%, about 75%, about 70%, about 65%, about 60%, about 55%, or about 50% of the total daily energy intake. Any combination of these lower and upper limit values can be used. As used herein, the percent energy from fat is calculated based on 9 kcal/g for fat.

Alternatively, the "high-fat diet" as used herein is characterized in that daily fat intake in the diet is set at about 80 g or more based on a real body weight of 50 kg. The lower limit of the daily fat intake in the "high-fat diet" may be about 90 g, about 100 g, about 110 g, about 115 g, about 120 g, about 125 g, about 130 g, about 135 g, about 140 g, about 145 g, or about 150 g. The upper limit may be about 180 g, about 170 g, about 160 g, about 150 g, or about 140 g. Any combination of these lower and upper limit values can be used.

The fat in the high-fat diet may be a short-chain fatty acid oil, a medium-chain fatty acid oil, a long-chain fatty acid oil, or any combination thereof. The fat in the high-fat diet preferably comprises a high percentage of medium-chain fatty acid oil. The lower limit of the percentage of the medium-chain fatty acid oil in the fat may be about 10%, about 20%, about 30%, about 40%, about 50%, about 60%, about 70%, or about 80%. The upper limit may be about 90%, about 80%, about 70%, or about 60%. Any combination of these lower and upper limit values can be used.

The medium-chain fatty acid oil is an oil composed of fatty acids of medium length and is also referred to as MCT (medium chain triglyceride). Typically, the medium-chain fatty acid oil is composed of fatty acids each having 6 to 12 carbon atoms, preferably 8 to 12 carbon atoms, 8 to 11 carbon atoms, or 8 to 10 carbon atoms. The medium-chain fatty acid oil is more easily digestible and absorbable than commonly used oils and is more readily convertible to energy. Examples of the medium-chain fatty acid include hexanoic acid (caproic acid; C6), octanoic acid (caprylic acid; C8), nonanoic acid (pelargonic acid; C9), decanoic acid (capric acid; C10), and dodecanoic acid (lauric acid; C12).

The medium-chain fatty acid oil is present in fats and oils contained in plants such as coconut, palm fruit, and other palm plants and in milk and other dairy products. The medium-chain fatty acid oil can be extracted (or crudely extracted) or purified (or crudely purified) from these fats and oils (preferably vegetable fats and oils such as palm kernel oil) and used as it is or as a raw material. Alternatively, the medium-chain fatty acid oil may be a chemical synthetic product or a commercial product. For example, Nisshin MCT Oil & Powder (manufactured by Nisshin Oillio) and Extra Virgin Coconut Oil (manufactured by Nisshin Oillio) can be used as the medium-chain fatty acid oil.

As used herein, the "sugar-restricted" means that daily sugar intake is restricted to about 100 g or less based on a real body weight of 50 kg. This value is calculated based on the description in the "Dietary Reference Intakes for Japanese" (2015 edition) published by the Ministry of Health, Labor and Welfare, which states, "If the basal metabolic rate is 1,500 kcal/day, the energy consumption of the brain would be 300 kcal/day, which is equal to 75 g/day of glucose. Since tissues other than the brain also use glucose as an energy source as explained above, the glucose requirement is estimated to be at least 100 g/day. In other words, the minimum requirement for digestible carbohydrates is estimated to be about 100 g/day."; and therefore, it will be understood that the value of the daily sugar intake specified above can vary. The upper limit of the daily sugar intake in the "sugar-restricted diet" may be about 90 g, about 80 g, about 70 g, about 60 g, about 50 g, about 40 g, about 35 g, about 30 g, about 25 g, about 20 g, about 15 g, or about 10 g. The lower limit may be about 5 g, about 10 g, about 15 g, about 20 g, about 25 g, about 30 g, or about 60 g. Any combination of these lower and upper limit values can be used.

In the sugar-restricted, high-fat diet of the present invention, sugar intake may be set lower during the introduction phase, and for example, may be restricted to about 20 g/day or less or about 10 g/day or less. A lower sugar intake during the introduction phase can induce a rapid increase in blood ketone bodies (acetoacetic acid and β-hydroxybutyric acid). However, such a diet during the introduction phase differs from original dietary habits. In order to continue the sugar-restricted, high-fat diet and thus achieve therapeutic benefits therefrom, gradually relaxing the restriction of sugar intake is helpful. For example, sugar intake may be set at about 5 to 15 g/day or thereabouts (±about 5 g/day) in the introduction phase, maintained at about 15 to 25 g/day or thereabouts (±about 5 g/day) in the second phase, and then maintained at about 25 to 35 g/day or thereabouts (±about 10 g/day) in the subsequent maintenance phase.

The sugar-restricted, high-fat diet may comprise a monosaccharide such as glucose, fructose, or galactose, a disaccharide such as maltose, sucrose, or lactose, or a polysaccharide such as starch (amylose, amylopectin), glycogen, or dextrin, or any combination thereof within the scope of sugar restriction (e.g., within the range of the daily sugar intake described above). The sugar-restricted, high-fat diet of the present invention may optionally be free of glucose or polysaccharides composed of glucose as a basal structural unit. The sugar-restricted, high-fat diet of the present invention preferably comprises lactose (milk sugar), more preferably comprises lactose (milk sugar) without glucose, and particularly preferably comprises substantially only lactose (milk sugar) as a sugar within the scope of sugar restriction (e.g., within the range of the daily sugar intake described above).

The sugar-restricted, high-fat diet of the present invention may comprise a protein. The lower limit of the percentage of the protein in the sugar-restricted, high-fat diet of the present invention may be about 5% by mass or about 10% by mass. The upper limit may be about 40% by mass, about 30% by mass, or about 20% by mass. Any combination of these lower and upper limit values can be used.

Daily calorie intake in the sugar-restricted, high-fat diet of the present invention is preferably, but not limited to, about 20 kcal/kg or more (about 1000 kcal or more for a standard body weight of 50 kg). For example, it may be about 14 kcal/kg/day or more, about 16 kcal/kg/day or more, or about 18 kcal/kg/day or more. Preferably, it is about 22 kcal/kg/day or more, about 24 kcal/kg/day or more, about 26 kcal/kg/day or more, about 28 kcal/kg/day or more, or about 30 kcal/kg/day or more.

The ketone ratio (lipid/(protein+sugar)) (mass ratio) in the sugar-restricted, high-fat diet of the present invention is preferably about 1 or more (rich in lipid). For example, the ketone ratio may be about 2 or more or about 2.5 or more. The upper limit of the ketone ratio can be, for example, about 4 or about 3.5. The ketone ratio during the introduction phase is preferably about 2. The combined intakes of protein and sugar in the sugar-restricted, high-fat diet may be any amount as long as the ketone ratio meets the above-described level. The combined intakes of protein and sugar in the sugar-restricted, high-fat diet may be about 30 g/day or less, about 20 g/day or less, or about 10 g/day or less. The combined intakes of protein and sugar can be varied according to the time of year. The combined intakes of protein and sugar per meal may be any amount as long as they are within the combined intakes of protein and sugar per day, but are preferably about 10 g or less per meal.

A preferable example of the sugar-restricted, high-fat diet of the present invention is a sugar-restricted, high-fat diet comprising about 25 to 40% by mass long-chain fatty acid oil, about 30 to 50% by mass medium-chain fatty acid oil, about 0 to 15% by mass sugar, and about 10 to 30% by mass protein.

The sugar-restricted, high-fat diet may be the Atkins diet when used for children, or the modified Atkins diet when used for adults. The modified Atkins diet is as follows.

(1) During the first week, calorie intake is set at about 30 kcal/kg body weight on a real body weight basis, lipid and protein intakes are unrestricted, and the target for sugar (a type of carbohydrate other than a dietary fiber) intake is set at about 10 g or less. Specifically, when the real body weight is 50 kg, calorie intake is set at about 1500 kcal/day, and the lipid:protein:sugar intake ratio is about 140 g:about 60 g:about 10 g per day in the introduction phase. The target for the ketone ratio (lipid/(protein+sugar)) is set at 2. Other nutrients may be consumed without restriction. Essential trace elements and vitamins are taken in supplements or other forms as needed. The period can be extended or shortened as needed and may range from several days to several weeks.

(2) From the second week to the third month, sugar intake and medium-chain fatty acid intake via a ketogenic formula and MCT oil are adjusted with reference to blood ketone body levels. For example, the targets for acetoacetic acid and β-hydroxybutyric acid levels are set at 500 μmol/L or more and 1000 μmol/L or more, respectively, and if possible, at 1000 μmol/L or more and 2000 μmol/L or more, respectively. Sugar intake is set at about 20 g/day or less, and calorie intake is set at about 1400 to 1600 kcal/day. The lipid:protein:sugar intake ratio is set at about 120 to 140 g:about 70 g:about 20 g per day, and the target for the ketone ratio is set at about 1 to 2. For caloric supplementation, MCT oil and a ketogenic formula can preferably be used. The period can be extended or shortened as needed. The starting point may be shortly before or after the start of the second week, and the end point may be shortly before or after the start of the third month (the schedule may be shifted by one, two, or several weeks).

(3) After the third month, sugar intake is set at 10 g per meal and at about 30 g or less per day, and the others are set basically in the same manner as in the above (2).

The sugar-restricted, high-fat diet can be provided in the form of an appropriate combination of a main dish, a side dish, a soup, etc. This means that the sugar-restricted, high-fat diet of the present invention can be provided in the form of a home delivery meal, a home delivery meal box, a frozen meal box, etc. In addition, the sugar-restricted, high-fat diet can be provided in the form of a sugar-restricted, high-fat meal kit that includes a set of ingredients for a main dish, a side dish, a soup, etc., and a cooking recipe. Furthermore, the sugar-restricted, high-fat diet can be provided in the form of a frozen food, a dairy product, a chilled food, a nutritional food, a liquid food, a nursing food, a beverage, etc.

The present invention provides a sugar-restricted, high-fat composition for improving liver disease. The sugar-restricted, high-fat composition of the present invention can be used in such a manner as to meet the intake (fat intake, sugar intake, protein intake, calorie intake, etc.) levels required by the sugar-restricted, high-fat diet of the present invention described above.

Preferable examples of the sugar-restricted, high-fat composition of the present invention include a ketogenic formula (817-B; Meiji Co., Ltd.), compositions equivalent in ingredient composition to this formula, and modified compositions of the formula. The modified compositions of the ketogenic formula include, for example, compositions that are the same as the ketogenic formula (817-B) except for having reduced amounts of sugar and/or protein, and compositions that are the same as the ketogenic formula (817-B) except that the amounts of the ingredients are independently varied by ±about 5%, ±about 10%, ±about 15%, ±about 20%, or ±about 25%. The ingredient composition of the ketogenic formula is shown in Tables 1 and 2.

TABLE 1

| Ingredient composition of ketogenic formula (817-B) (1) | |
| --- | --- |
| Ingredients | Amount per 100 g of ketogenic formula (% E) |
| Protein | 15.0 g (8.1) |
| Lipid | 71.8 g (87.2) |
| Carbohydrate | 8.8 g (4.7) |

TABLE 1-continued

| Ingredient composition of ketogenic formula (817-B) (1) | |
| --- | --- |
| Ingredients | Amount per 100 g of ketogenic formula (% E) |
| Ash | 2.4 g (0) |
| Water | 2.0 g (0) |
| Energy | 741 kcal |

Notes:

Protein: Lactoprotein

Lipid: Long-chain fatty acid fat and oil (essential fatty acid-modified fat) 32.1 g (39.0% E)

Medium-chain fatty acid fat and oil 39.7 g (48.2% E)

Carbohydrate: Lactose

% E: % Energy

TABLE 2

| Ingredient composition of ketogenic formula (817-B) (2) | |
| --- | --- |
| Ingredients | Amount per 100 g of ketogenic formula |
| Vitamin A | 600 µg RE |
| Vitamin B1 | 0.6 mg |
| Vitamin B2 | 0.9 mg |
| Vitamin B6 | 0.3 mg |
| Vitamin B12 | 4 µg |
| Vitamin C | 50 mg |
| Vitamin D | 12.5 µg |
| Vitamin E | 6 mg α-TE |
| Vitamin K | 30 µg |
| Pantothenic acid | 2 mg |
| Niacin | 6 mg |
| Folic acid | 0.2 mg |
| Calcium | 350 mg |
| Magnesium | 36 mg |
| Sodium | 165 mg |
| Potassium | 470 mg |
| Phosphorus | 240 mg |
| Chlorine | 320 mg |
| Iron | 6 mg |
| Copper | 350 µg |
| Zinc | 2.6 mg |

The sugar-restricted, high-fat composition of the present invention can be used as the sugar-restricted, high-fat diet of the present invention (preferably the modified Atkins diet).

The sugar-restricted, high-fat diet and sugar-restricted, high-fat composition of the present invention can be used for improving liver disease. Examples of the liver disease include acute viral hepatitis, liver injury induced by drugs (antibiotics, antipyretic analgesics, neuropsychiatric drugs, anticancer drugs, oriental medicine, etc.), chronic hepatitis B, chronic hepatitis C, liver cirrhosis, liver cancer, alcoholic liver injury, primary biliary cirrhosis, autoimmune hepatitis, nonalcoholic fatty liver disease (NAFLD), and nonalcoholic steatohepatitis (NASH). As shown in the Examples below, according to the present inventors' study, a lung cancer patient diagnosed with NAFLD was placed on the sugar-restricted, high-fat diet of the present invention, and after the dietary intervention, body fat was significantly reduced, and AST, ALT, and γ-GTP levels and FIB4-index were reduced below the upper limits of the respective normal ranges.

The present invention further includes the following.

A method for improving liver disease, comprising placing a liver disease patient on a sugar-restricted, high-fat diet.

A sugar-restricted, high-fat diet for use in improving liver disease.

Use of a sugar-restricted, high-fat diet for improving liver disease.

A method for reducing at least one selected from AST, ALT, and γ-GTP levels in a liver disease patient, comprising placing the patient on a sugar-restricted, high-fat diet.

A sugar-restricted, high-fat diet for use in reducing at least one selected from AST, ALT, and γ-GTP levels in a liver disease patient.

Use of a sugar-restricted, high-fat diet for reducing at least one selected from AST, ALT, and γ-GTP levels in a liver disease patient.

EXAMPLES

Hereinafter, the present invention will be described in detail by examples, but the present invention is not limited thereto.

Example 1: Clinical Study of Ketogenic Diet Regimen for Cancer Treatment 1-1 Test method (1) Participants Patients who had stage IV cancer, a performance status (PS) of 2 or lower, and were capable of oral ingestion were included in the study. Fifty-five cancer patients (24 men and 31 women) participated in the study. The average age of the participants was 55.8±12.1 years. Forty-two of the participants had received chemotherapy, 32 had received surgery, and 17 had received radiation therapy.

(2) Ketogenic Diet

From the initial time until one week later, calorie intake was set at 30 kcal/kg/day on a real body weight basis. Lipid and protein intakes were unrestricted, and the target for carbohydrate (a type of carbohydrate other than a dietary fiber, which is equivalent to sugar, and the same applies hereinafter) intake was set at 10 g/day or less. For example, for a real body weight of 50 kg, calorie intake was set at 1500 kcal/day, and the lipid:protein:sugar intake ratio was set at 140 g:60 g:10 g per day. The target for the ketone ratio [lipid (g):(protein (g)+carbohydrate (g))] was set at 2:1. Other nutrients were allowed to be consumed without restriction. Essential trace elements and vitamins were taken in supplements or other forms as needed. In the introduction phase, the participants took meals prepared according to the ketogenic diet menu provided by dietitians.

From one week to three months after the start of the ketogenic diet, the contents of the meals were determined with reference to blood ketone body measurements. Regarding blood ketone body levels, the targets for acetoacetic acid and β-hydroxybutyric acid levels were set at 500 µmol/L or more and 1000 µmol/L or more, respectively, and if possible, at 1000 µmol/L or more and 2000 µmol/L or more, respectively. Carbohydrate intake was set at 20 g/day or less. For example, for a real body weight of 50 kg, calorie intake was set at 1400 to 1600 kcal/day, and the lipid:protein:sugar intake ratio was set at 120 to 140 g:70 g:20 g per day. The target for the ketone ratio [lipid (g):(protein (g)+carbohydrate (g))] was set at 2:1 to 1:1. For caloric supplementation, "MCT Oil" (manufactured by Nisshin OilliO) or "Keton-formula" (manufactured by Meiji Co., Ltd.) was used.

(3) Blood Sampling and Biochemical Tests

Blood samples were taken before the start of the ketogenic diet, one week after the start of the ketogenic diet, one month after the start of the ketogenic diet, two months after the start of the ketogenic diet, and three months after the start of the ketogenic diet to measure blood acetoacetic acid, blood β-hydroxybutyric acid, AST, ALT, γ-GTP, and ALP. At the same time points, various body composition parameters were also measured using a body composition analyzer (InBody 720).

ECW/TBW remained unchanged. These results show that the ketogenic diet reduced body fat mass, resulting in a reduction in body weight and BMI.

TABLE 3

| | n | Before start of ketogenic diet Median [IQR] | 3 months after start of ketogenic diet Median [IQR] | p (BL vs 3M) |
|---|---|---|---|---|
| Body weight (kg) | 34 | 52.8 [47.2, 58.2] | 49.3 [44.8, 56.9] | <0.001 |
| BMI (kg/m$^2$) | 34 | 20.22 [18.44, 21.87] | 19.66 [17.78, 20.43] | <0.001 |
| Appendicular skeletal muscle mass (kg) | 34 | 16.3 [13.6, 20.2] | 16.3 [13.4, 20.1] | 0.057 |
| SMI (kg/m$^2$) | 34 | 6.19 [5.55, 7.10] | 6.21 [5.57, 6.95] | 0.057 |
| Body fat mass (kg) | 34 | 11.0 [7.9, 15.5] | 10.0 [6.9, 13.0] | <0.001 |
| Body fat percentage (%) | 34 | 20.87 [15.91, 27.57] | 18.67 [13.35, 25.24] | <0.001 |
| ECW/TBW | 34 | 0.391 [0.385, 0.395] | 0.392 [0.387, 0.399] | 0.067 |

Of a total of 55 participants, 5 did not take the ketogenic diet, 11 discontinued the study, and 2 were excluded from the analysis, so that 37 participants (15 males and 22 females) were finally analyzed. The finally analyzed participants had an average age of 54.8±12.6 years, an average body height of 162.5±9.5 cm, an average body weight of 55.5±13.2 kg, and an average BMI of 20.9±3.7 as of the start of the study. Six of the finally analyzed participants had lung cancer, 8 had colorectal cancer, 5 had breast cancer, 1 had ovarian cancer, 1 had bladder cancer, and 16 had other cancers. Thirty-two of the finally analyzed participants had received chemotherapy, 25 had received surgery, and 13 had received radiation therapy.

1-2 Results (1) Change in Blood Ketone Body Levels

Figure 2:
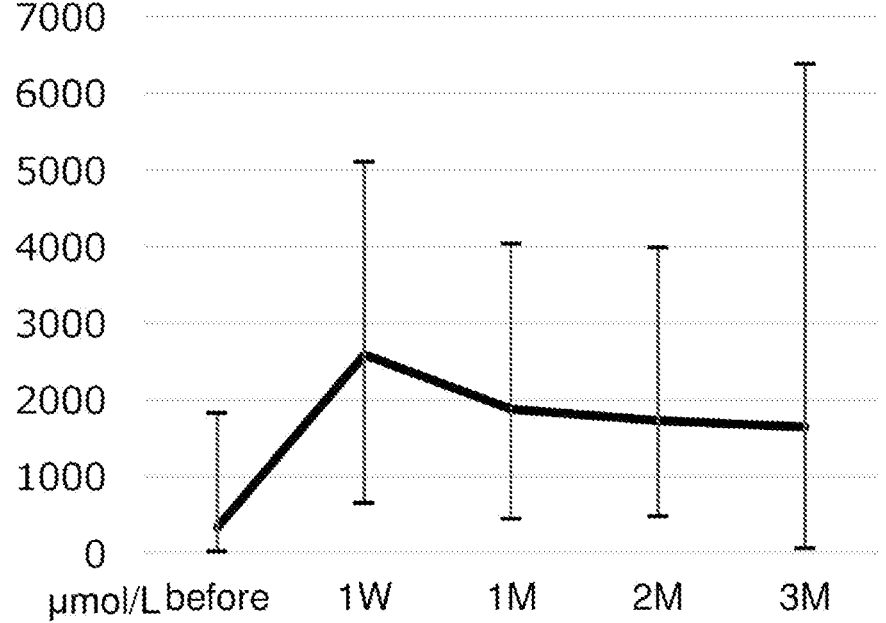
FIG. 2 shows a change in blood β-hydroxybutyric acid levels in 37 analyzed patients who participated in the clinical study of a ketogenic diet regimen for cancer treatment.

FIG. 1 shows a change in blood acetoacetic acid levels in the analyzed participants from before the start of the ketogenic diet to 3 months after the start of the ketogenic diet. FIG. 2 shows a change in blood β-hydroxybutyric acid levels in the analyzed participants from before the start of the ketogenic diet to 3 months after the start of the ketogenic diet. The average acetoacetic acid level was maintained at 500 μmol/L or more throughout the test period, and the average β-hydroxybutyric acid level was maintained at 1000 μmol/L or more throughout the test period.

(2) Changes in Liver Function Test Values

Figure 3:
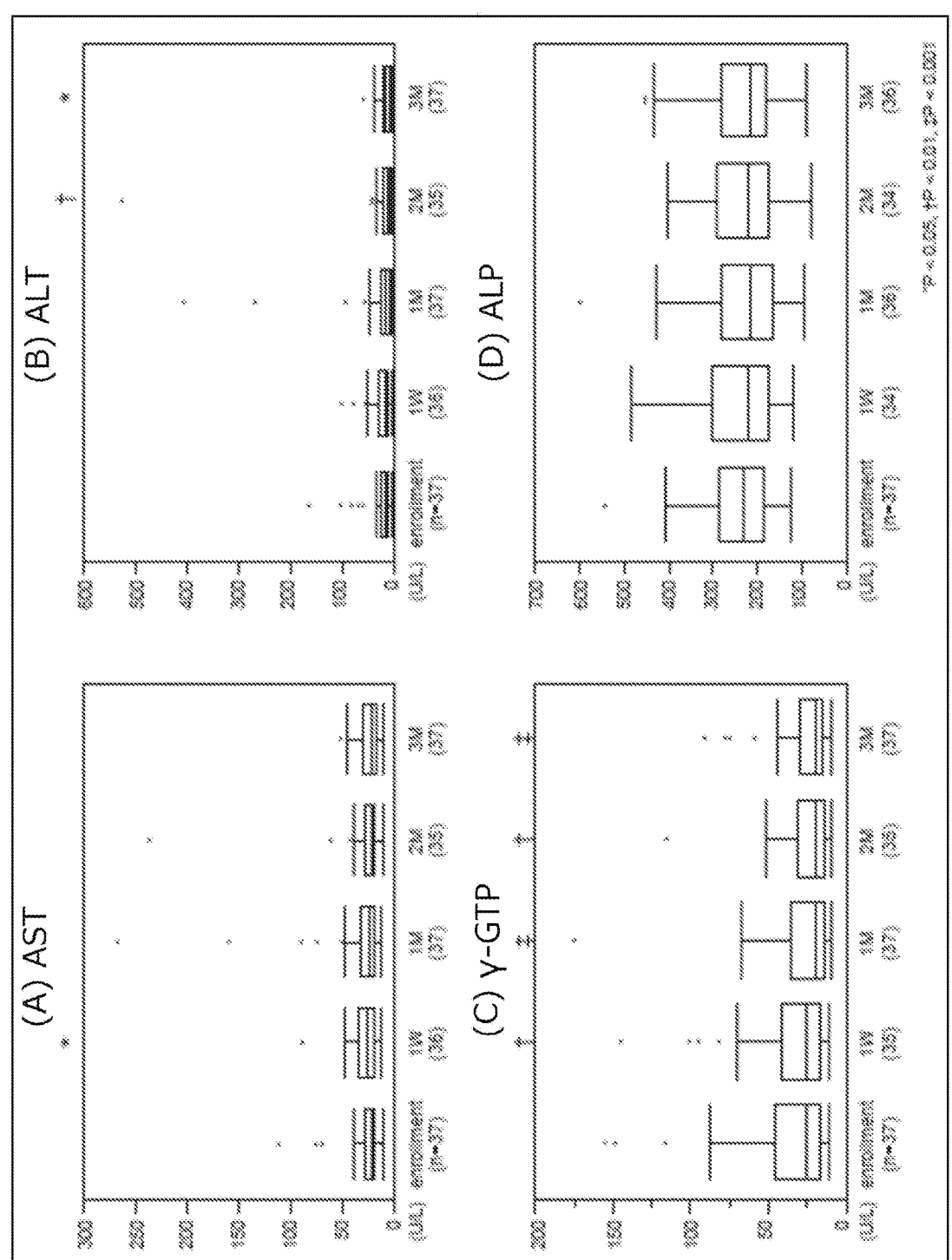
FIG. 3 shows changes in liver function test values in 37 analyzed patients who participated in the clinical study of a ketogenic diet regimen for cancer treatment.

FIG. 3 shows changes in liver function test values in the analyzed participants from before the start of the ketogenic diet to 3 months after the start of the ketogenic diet. FIG. 3A shows the results for AST, FIG. 3B shows the results for ALT, FIG. 3C shows the results for γ-GTP, and FIG. 3D shows the results for ALP. ALT was significantly lower at 2 and 3 months after the start of the ketogenic diet than at the start of the ketogenic diet. In addition, γ-GTP was significantly lower at all time points from 1 week to 3 months after the start of the ketogenic diet than at the start of the ketogenic diet. These results demonstrate that the ketogenic diet is effective in improving liver function.

(3) Changes in Body Composition Parameters

Table 3 shows body weight, body mass index (BMI), appendicular skeletal muscle mass, skeletal muscle index (SMI), body fat mass, body fat percentage, and extracellular water/total body water (ECW/TBW) in the analyzed participants before the start of the ketogenic diet and 3 months after the start of the ketogenic diet. Three months after the start of the ketogenic diet, body weight, BMI, body fat mass, and body fat percentage were significantly reduced. On the other hand, appendicular skeletal muscle mass, SMI, and Example 2: Case Report of Significant Response Data from a patient who had a significant improvement in liver function in response to a ketogenic diet regimen for cancer treatment are shown below.

2-1 Medical History

The patient was a 55-year-old man with lung cancer. In November 2017, left pleural effusion was detected, and the patient visited a flagship hospital. He underwent PET-CT, tissue biopsy, etc. and finally had a diagnosis of lung cancer. He started oral treatment with crizotinib (Xalkori (registered trademark)) (1 capsule (250 mg) per dose, twice daily). A ketogenic diet regimen was started in January 2018. As of the start of the ketogenic diet regimen, the patient had a body height of 184 cm, a body weight of 85.1 kg, a BMI of 25.1 kg/cm$^2$, a body fat mass of 23.3 kg, an SMI of 7.9 kg/cm$^2$, an AST of 112 U/L, an ALT of 165 U/L, a γ-GTP of 117 U/L, an FIB4-index of 1.74 (FIB4-index is a marker for liver fibrosis, (age×AST)/(platelet count×ALT$^{1/2}$), an FIB4-index of 1.30 or more indicates possible liver fibrosis). The patient was identified as not having autoimmune liver disease or viral liver disease based on his medical history but as having NAFLD based on alcohol consumption history and test results as described above.

2-2 Results (1) Change in Blood Ketone Body Level

Figure 4:
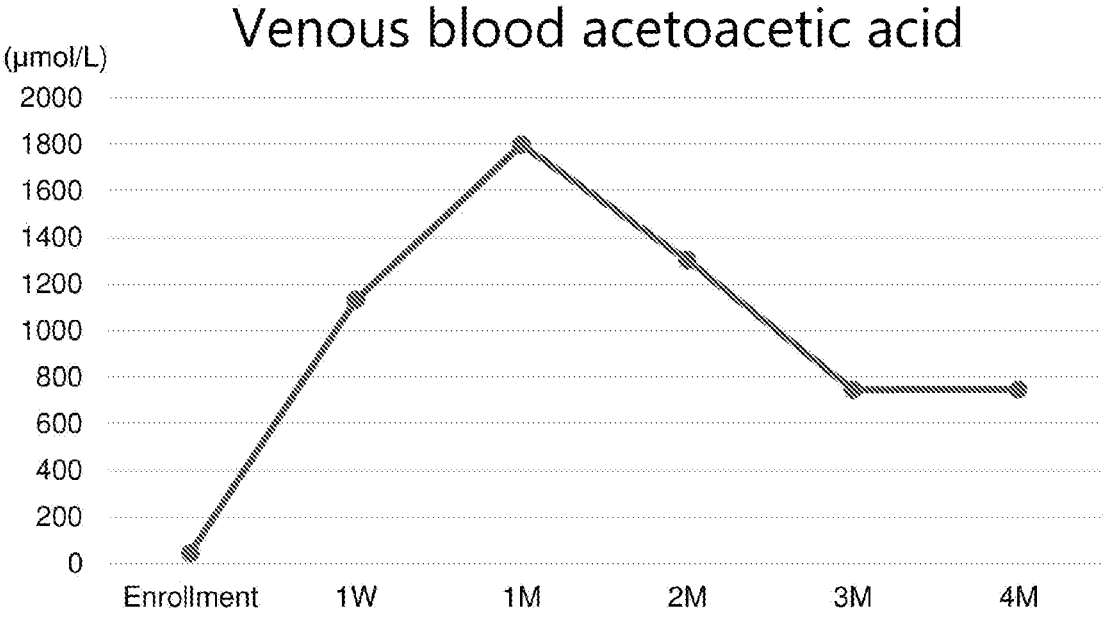
FIG. 4 shows a change in blood acetoacetic acid level in an NAFLD patient who had a significant improvement in liver function in response to a ketogenic diet regimen for cancer treatment.
Figure 5:
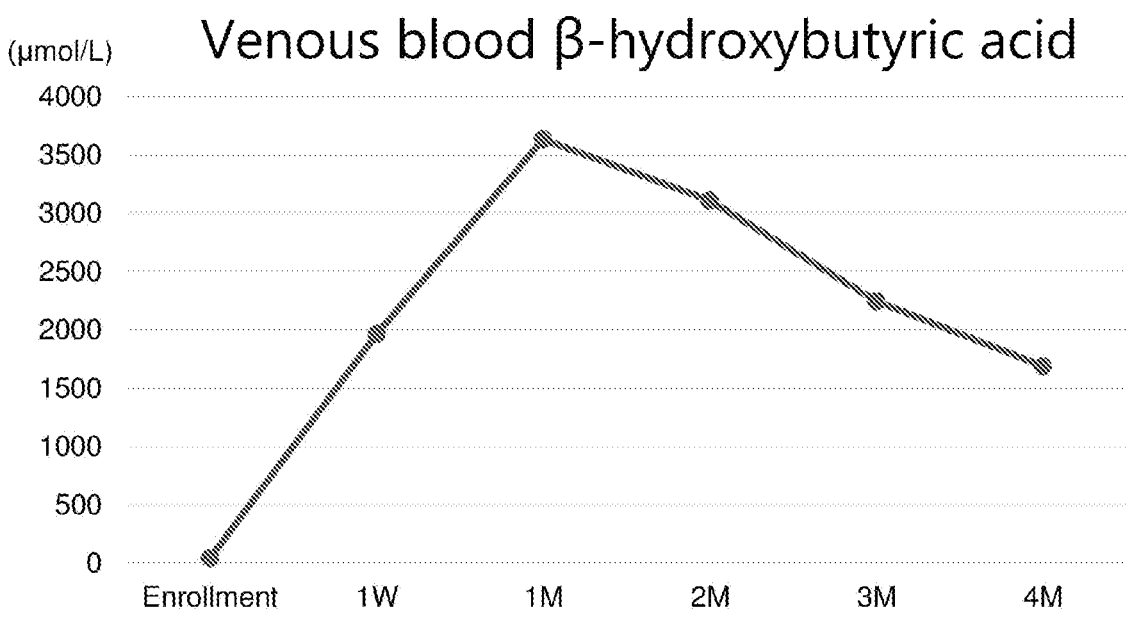
FIG. 5 shows a change in blood β-hydroxybutyric acid level in an NAFLD patient who had a significant improvement in liver function in response to a ketogenic diet regimen for cancer treatment.

FIG. 4 shows a change in blood acetoacetic acid level in the patient from before the start of the ketogenic diet to 4 months after the start of the ketogenic diet. FIG. 5 shows a change in blood β-hydroxybutyric acid level in the patient from before the start of the ketogenic diet to 4 months after the start of the ketogenic diet. The acetoacetic acid level increased to about 1800 μmol/L one month after the start of the ketogenic diet, and then decreased but was maintained at about 700 μmol/L after the third month. The β-hydroxybutyric acid level increased to about 3600 μmol/L one month after the start of the ketogenic diet, and then gradually decreased reaching about 1700 μmol/L four months after the start of the ketogenic diet.

(2) Changes in Liver Function Test Values

Figure 6:
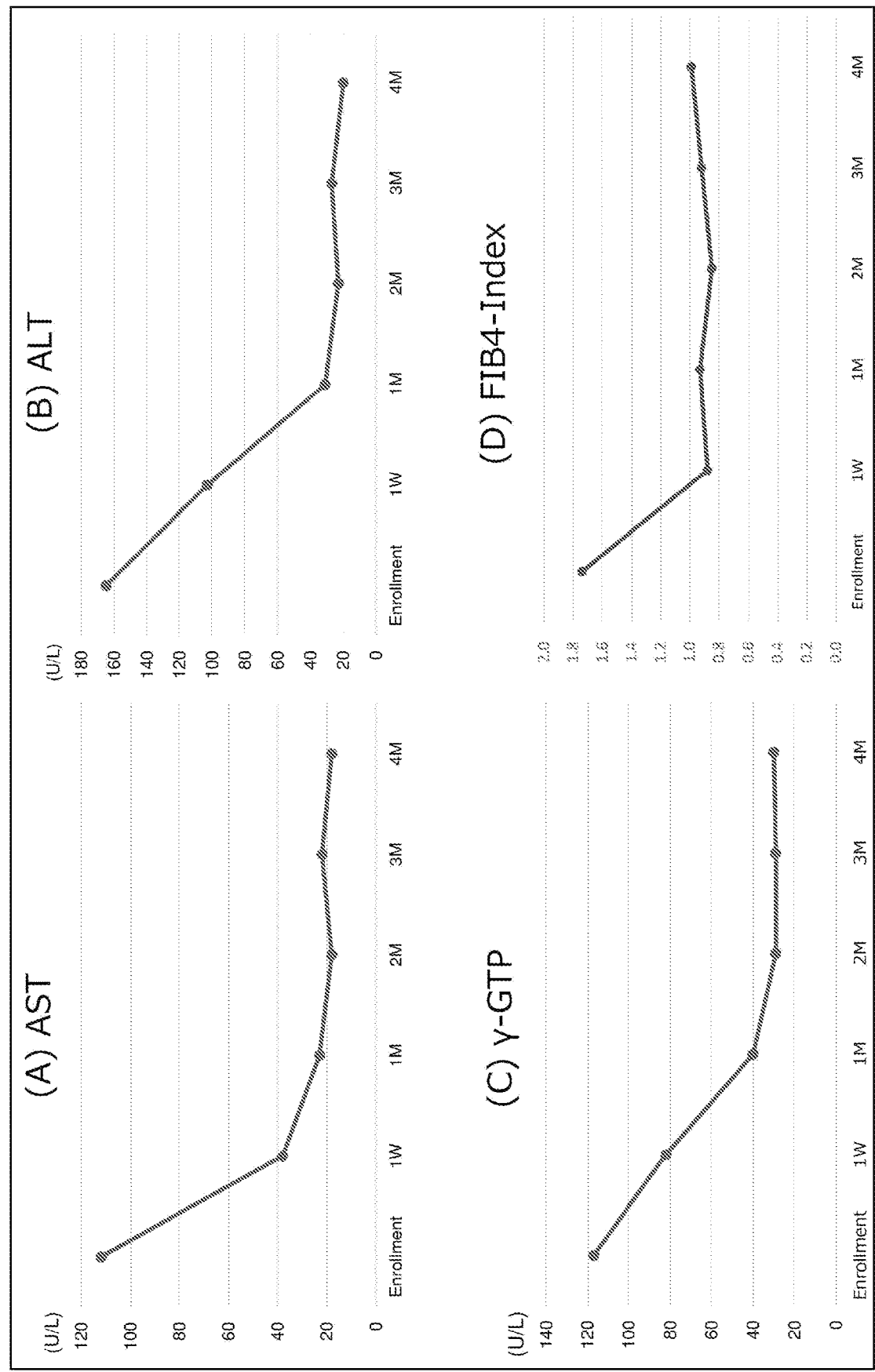
FIG. 6 shows changes in liver function test values in an NAFLD patient who had a significant improvement in liver function in response to a ketogenic diet regimen for cancer treatment.

FIG. 6 shows changes in liver function test values in the patient from before the start of the ketogenic diet to 4 months after the start of the ketogenic diet. FIG. 6A shows a change in AST, FIG. 6B shows a change in ALT, FIG. 6C shows a change in γ-GTP, and FIG. 6D shows a change in FIB4-index. Before the start of the ketogenic diet, the patient had an AST of about 110 U/L, an ALT of about 165 U/L, a γ-GTP of about 120 U/L, and an FIB4-index of 1.74, all of which were abnormally high. The AST level was reduced below the upper limit of the normal range one week after the start of the ketogenic diet and thereafter remained within the normal range. The ALT and γ-GTP levels were reduced below the upper limits of the respective normal ranges one month after the start of the ketogenic diet and thereafter remained within the normal ranges. FIB4-index was reduced to 0.88 (an FIB4-index of 1.30 or less indicates a low possibility of liver fibrosis) one week after the start of the ketogenic diet and thereafter remained at this level. The results demonstrate that the ketogenic diet provided a significant improvement in liver function in the lung cancer patient identified as having NAFLD.

(3) Changes in Body Composition Parameters

Figure 7:
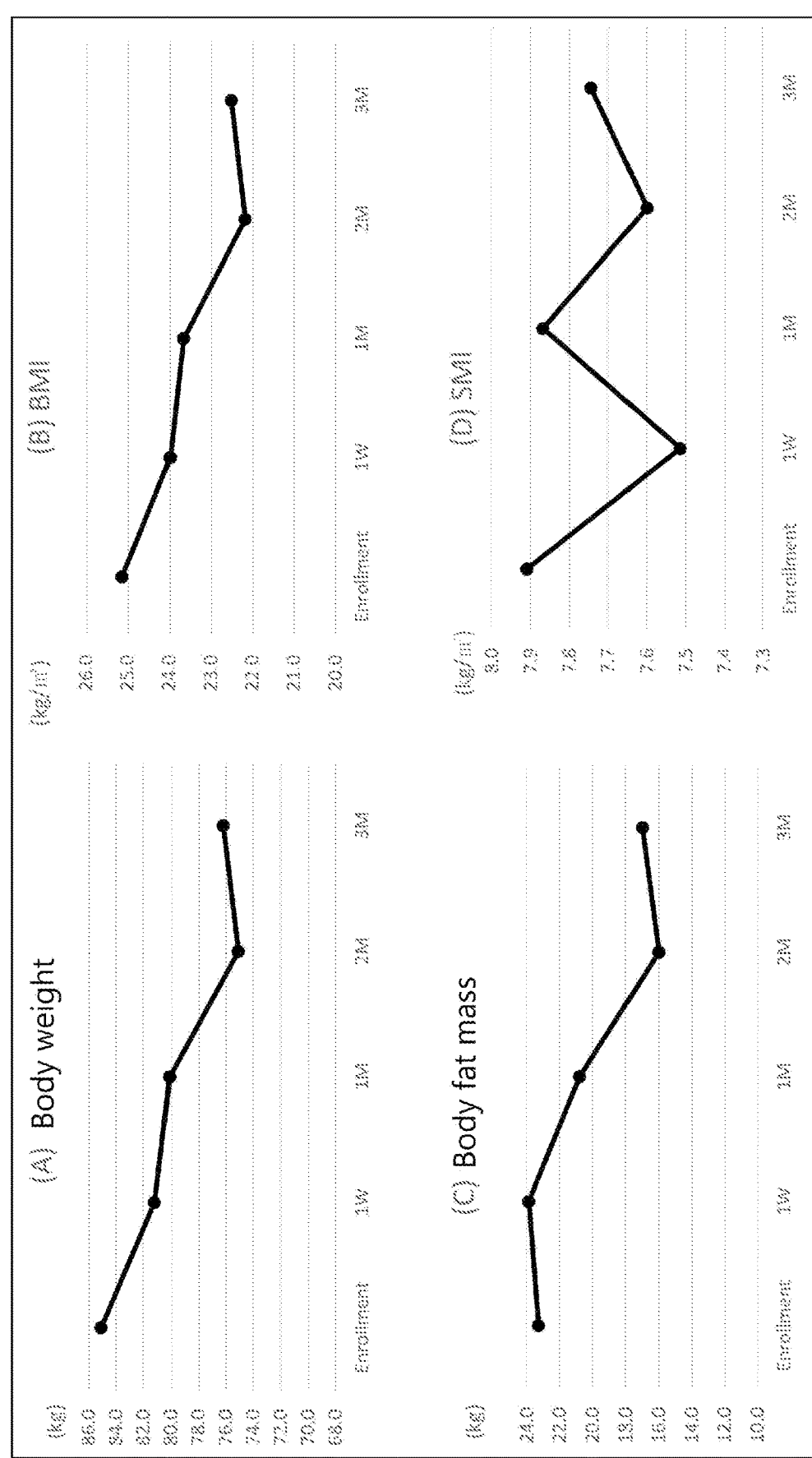
FIG. 7 shows changes in body composition parameters in an NAFLD patient who had a significant improvement in liver function in response to a ketogenic diet regimen for cancer treatment.

FIG. 7 shows changes in body composition parameters in the patient from before the start of the ketogenic diet to 3 months after the start of the ketogenic diet. FIG. 7A shows a change in body weight, FIG. 7B shows a change in BMI, FIG. 7C shows a change in body fat mass, and FIG. 7D shows a change in SMI. The body weight decreased from 85.1 kg before the start of the ketogenic diet to 76.2 kg three months after the start of the ketogenic diet (74.5 kg is a standard weight for a 184-cm-tall person). BMI decreased from 25.1 (obesity class 1) before the start of the ketogenic diet to 22.5 (normal weight) three months after the start of the ketogenic diet. The body fat mass decreased from 23.3 kg to 17.0 kg, whereas SMI, an index for muscle mass, was 7.9 before the start of the ketogenic diet and 7.7 three months later, showing little or no change. The results demonstrate that the ketogenic diet provided a reduction in the patient's body fat, which seemingly resulted in the improvement in liver function and improvement of NAFLD in the patient.

The present invention is not limited to the particular embodiments and examples described above, and various modifications can be made within the scope of the appended claims. Other embodiments provided by suitably combining technical means disclosed in separate embodiments of the present invention are also within the technical scope of the present invention.

The invention claimed is:

1. A method for improving liver disease in a patient, comprising placing the patient on a sugar-restricted and high-fat diet comprising a daily fat intake set at 120 g or more per 50 kg of body weight of the patient or set at an amount corresponding to 70% or more of a total daily energy intake of the patient, and a daily sugar intake set at 30 g or less per 50 kg of body weight of the patient, wherein the liver disease is nonalcoholic fatty liver disease or nonalcoholic steatohepatitis, wherein the diet comprises a medium-chain fatty acid oil and lactose, and wherein the improving of liver disease is associated with a decreased aspartate aminotransferase (AST), alanine aminotransferase (ALT), gamma-glutamyl transpeptidase (γ-GTP) levels and Fibrosis 4 index (FIB4-index).

2. The method according to claim 1, wherein the improving of liver disease is further associated with a decreased body fat mass.

3. The method according to claim 1, wherein the percentage of the medium-chain fatty acid oil in the fat is 30% by mass or more.

4. The method according to claim 1, wherein the diet comprises 5 to 40% by mass protein.

5. The method according to claim 1, wherein daily calorie intake in the diet is set at 1000 kcal or more per 50 kg of body weight of the patient.

6. The method according to claim 1, wherein the diet comprises 25 to 40% by mass long-chain fatty acid oil, 30 to 50% by mass medium-chain fatty acid oil, 15% by mass or less sugar, and 10 to 30% by mass protein.

\* \* \* \* \*